United States Patent [19]

Yamamoto

[11] Patent Number: 4,901,106
[45] Date of Patent: Feb. 13, 1990

[54] METHOD OF DETERMINING EXPOSURE TIME FOR PHOTOGRAPHIC PRINTER

[75] Inventor: Shohei Yamamoto, Tokyo, Japan

[73] Assignee: Fuji Photo Film Co., Ltd., Kanagawa, Japan

[21] Appl. No.: 200,150

[22] Filed: May 26, 1988

[30] Foreign Application Priority Data

May 26, 1987 [JP] Japan .................. 62-129543

[51] Int. Cl.$^4$ ............................................. G03B 27/52
[52] U.S. Cl. ........................................ 355/55; 355/77
[58] Field of Search .............................. 355/55, 56, 77

[56] References Cited

U.S. PATENT DOCUMENTS

Re. 32,424  2/1951  Clark .
4,451,142   5/1984  Takenaka et al. ............... 355/55
4,610,539   6/1986  Kaneko et al. ............... 355/55 X
4,643,562   3/1987  Kaneko et al. ................... 355/56

FOREIGN PATENT DOCUMENTS 55-40496  3/1980  Japan .

Primary Examiner—L. T. Hix
Assistant Examiner—D. Rutledge
Attorney, Agent, or Firm—Sughrue, Mion, Zinn, Macpeak & Seas

[57] ABSTRACT

A method of determining exposure time for a photographic printer on the basis of a cubic function is provided. A plurality of test printings are conducted by using different print magnifications, in such a manner as to obtain the same density of test prints. Exposure times T during test printings are measured in correspondence with the print magnifications m. On the basis of the print magnifications m and the exposure times T, the exposure time is expressed as a cubic function $(am^3+bm^2+cm+d)$ of the print magnification. An exposure time for actual printing is determined on the basis of the above-mentioned cubic function, and printing is effected.

9 Claims, 2 Drawing Sheets

FIG. I

METHOD OF DETERMINING EXPOSURE TIME FOR PHOTOGRAPHIC PRINTER

BACKGROUND OF THE INVENTION

1. Field of the Invention

The present invention relates to a method of determining an exposure time for a photographic printer and, more particularly, to such a method which may be applied to a photographic printer capable of varying an enlargement or print magnification (the ratio of a length of a print to the corresponding length of the negative image) to determine optimum exposure time which corresponds to a print magnification set during printing.

2. Description of the Prior Art

One type of photographic printer has conventionally been known in which frame images recorded on an original film are enlarged or magnified, usually enlarged, and projected onto sheets of print paper to produce magnified prints. With such a photographic printer, the print magnification is varied to produce a magnified print of a predetermined size. However, when the print magnification is varied, the dimension of the image projected onto the sheet of print paper changes. Accordingly, if the printing is effected while the exposure time is kept unchanged, the optimal print would not be obtained. To overcome this problem, it has been the conventional practice to calculate the exposure time from the following formula: $T = (1+m)^2/4$ (where T represents the exposure time; and m represents the print magnification), to thereby determine the optimum exposure time corresponding to the print magnification set in the photographic printer. This method of determining an exposure time is based on the fact that the quantity of light per unit area is in inverse proportion to the square of the magnification.

If, however, the printer is a photographic printer for manual printing which is often applied to commercial use, prints must be printed with an increased level of precision. In this case, therefore, if an exposure time is determined on the basis of a fixed calculation formula, such as that mentioned above, prints would not be printed properly regardless of the emulsion number coated on the print paper, though this may depend on the characteristics of the print paper used.

In order to cope with this problem, another method of determining an exposure time has been used in particular with a photographic printer for manual printing. This method is adapted to conduct a plurality of test printings using different print magnifications and measure an exposure time to ensure the optimum print with each print magnification. The relationship between the exposure time and the print magnification is approximated to a linear relationship from the print magnifications used in the test printings and the exposure times measured. Then, a calculation is made on the basis of this linear relationship and, an exposure time corresponding to a print magnification is set for actual printing, so as to effect the printing.

With this conventional method of determining the exposure time, however, the relationship between the exposure time and the print magnification is determined as a linear relationship. Consequently, although proper prints can be provided with a print magnification within a certain region of magnification, proper prints cannot be provided with a print magnification outside this region. Thus, the conventional method fails to ensure proper prints with respect to the entire range of magnification extending from a region for reduction to a region for enlargement, thereby frequently forcing the photographer to restart his printing operation.

SUMMARY OF THE INVENTION

Accordingly, the present invention has been accomplished to solve the problems of the prior art. An object of the present invention is to provide a method of determining an exposure time which is capable of ensuring that prints exhibiting a high level of precision are obtained with respect to the entire range of print magnification. For reference, art related to the present invention is disclosed by Japanese Patent Laid-Open No. 40496/1980.

To this end, according to the present invention, there is provided a method of determining an exposure time for a photographic printer which is applicable to a photographic printer capable of varying the print magnification in order to determine an exposure time corresponding to a print magnification set during actual printing of the printer. The method comprises the steps of: conducting a plurality of test printings using different print magnifications, in such a manner as to obtain an optimum print each time; calculating, on the basis of each of the print magnifications used during the test printings and an exposure time which corresponds to each of the print magnifications, the relationship between the exposure time and the print magnification as a cubic function; and determining, on the basis of the cubic function, an exposure time which corresponds to a set print magnification.

With the method of the present invention, during the test printings, an exposure time which ensures an optimum print with each of the different print magnifications is measured, this process similar to that of the prior art. In this process, the judgment as to whether a test print is the optimum print or not is made on the basis of, for instance, whether test prints printed with each of the different print magnifications have the same density. Subsequently, the relationship between the exposure time and the print magnification is calculated as a cubic function on the basis of the print magnifications used in the test printings and the exposure times measured during the use of each of the print magnifications. The cubic function is generally expressed by the following formula: $T = am^3 + bm^2 + cm + d$ (where T represents the exposure time; m represents the print magnification; and a, b, c, and d, coefficients). Therefore if four different print magnifications are used and exposure times are measured, the constants a, b, c, and d in the above-stated formula can be calculated through substitution, to thereby determine the relationship between the exposure time and the print magnification as a cubic function. After the relationship has been calculated as a cubic function, an exposure time corresponding to a print magnification set for actual printing is determined on the basis of the thus calculated cubic function, and the exposure to light of print paper is controlled in accordance with the determined exposure time. In this way, since the relationship between the exposure time and the print magnification is determined by approximating it to a cubic function, data can be smoothly plotted, thereby allowing the exposure time to be determined at high level of precision. Further, the cubic function is determined from at least four sets of data, and the number of sets of data can be freely set at four or more from the viewpoint of the balance between the actual level of precision required and the operation efficiency.

Further, if the relationship between the exposure time and the print magnification is similarly calculated as a cubic function with respect to each of the three primaries, i.e., red (R), green (G), blue (B), and an exposure time corresponding to the set print magnification is determined on the basis of the thus determined cubic function with respect to each of the primaries, so as to control the exposure of print paper, it is possible to correct the color balance as well.

Thus, the method of the present invention is adapted to determine the relationship between the exposure time and the print magnification as a cubic function. Therefore, the method is capable of determining an optimum exposure time with respect to a wide range of magnification extending from reduction magnifications to enlargement magnifications. This feature of the method makes it possible to reduce the number of times the photographer has to restart his printing operation.

DESCRIPTION OF THE PREFERRED EMBODIMENT

Figure 1:
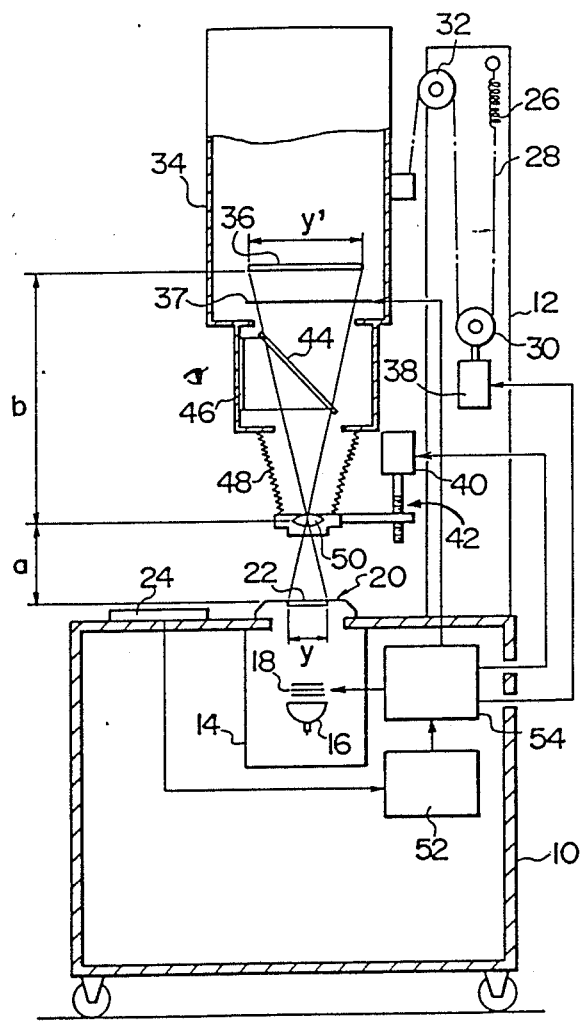
FIG. 1 is a schematic illustration of a photographic printer to which a method of determining an exposure time of the present invention is applicable.

A photographic printer to which a method determining an exposure time of the present invention is applicable will be described in detail with reference to FIG. 1. As shown in FIG. 1, the printer has a photographic printer main body 10, and a column 12 mounted on the main body 10. The column 12 rotatably supports sprocket wheels 30 and 32 on which a chain 28 is disposed. On end of the chain 28 is fixed to the support 12 through a spring 26, while the other end of the chain 28 is connected to a paper deck 34. The paper deck 34 is disposed in such a manner as to be movable in the vertical direction.

The main body 10 accommodates a lamp house 14 having an opening, and a negative carrier 20 is disposed over the opening of the lamp house 14. The lamp house 14 accommodates a halogen lamp 16 and a light-adjusting filter unit 18 which are disposed in this order toward the opening. The light-adjusting filter unit 18 comprises a yellow (Y) filter, a magenta (M) filter, and a cyan (C) filter, which are disposed in such a manner as to be movable individually in the direction normal to the optical axis. A negative film 22 is positioned by the negative carrier 20. At a location in the vicinity of the negative carrier 20, an operation panel 24 is provided and is used for inputting measurement data through the panel 24, for setting a print magnification, and for moving the negative carrier 20 to enable trimming.

In the paper deck 34, a print paper 36, a black shutter 37, and a mirror 44 are disposed. An enlarging lens 50 having a focal length of f is mounted below the paper deck 34 with a bellows 48 interposed therebetween. The arrangement of the printer is such that, when the mirror 44 is positioned as shown in FIG. 1, a beam emitted by the halogen lamp 16 passes through the light-adjusting filter unit 18, the negative film 22, and the enlarging lens 50, and it is then reflected by the mirror 44 to form an image on a viewer 46, so that the operator can observe a projected image of the image on the negative film 22. The mirror 44 is rotated in the vertical direction during a printing operation.

The column 12 also accommodates a pulse motor 38 the output shaft of which is connected to the sprocket wheel 30. When the wheel 30 is rotated by the motor 38, the paper deck 34 is vertically moved. The enlarging lens 50 is supported by a support plate through which a screw bolt 42 is thread. The screw bolt 42 is connected to another pulse motor 40 and, when the screw bolt 42 is rotated by the motor 40, the enlarging lens 50 is vertically moved. The operation panel 24 is connected to a microcomputer 52 having a RAM, a ROM, and a CPU (none of which are shown). The microcomputer 52 is connected to a drive device 54. The drive device 54 is in turn connected to the light-adjusting filter unit 18, the black shutter 37, and the pulse motors 38 and 40. The ROM of the microcomputer 52 stores a program for a control routine described below.

The operation provided by the method of the present invention will be described hereunder with reference to FIG. 2 which shows the control routine. First, using the photograph printer described above with reference to FIG. 1, test printings are conducted while setting the print magnification to a different value each time, in such a manner as to obtain the same density of a test print each time. While the print magnification is subsequently varied to, for instance, 0.5, 2, 5, and 10, printing and development processes are performed so as to obtain the prints having the same density in correspondence to the print magnifications varied, and exposure times corresponding to the print magnifications are measured. Exposure times measured in this way as well as the corresponding print magnifications are input through the control panel 24, as sets of data.

Figure 2:
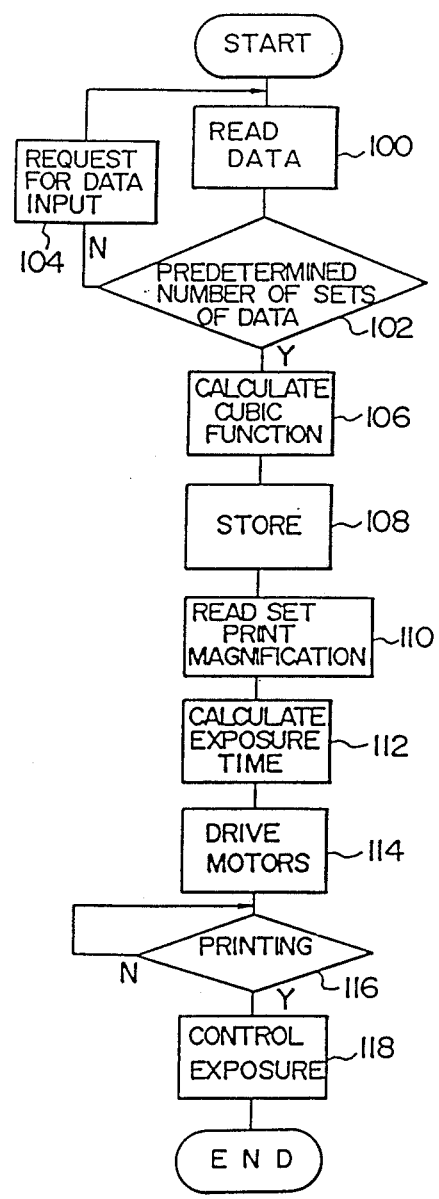
FIG. 2 is a flowchart showing an exposure control routine used in the method of determining the exposure time in accordance with an embodiment of the present invention.
Figure 3:
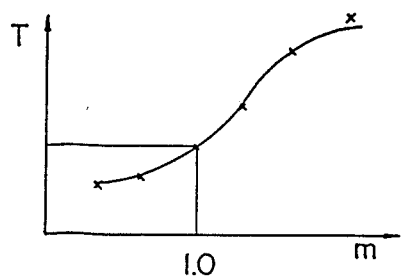
FIG. 3 is a graph showing the relationship between the print magnification and the exposure time, calculated by the method in accordance with the present invention.

The operation then proceeds to execute the control routine shown in FIG. 2. At Step 100, the thus input sets of data, each comprising one print magnification and the corresponding exposure time, are read. At Step 102, it is determined whether a predetermined number of data sets have been read. It is necessary for the number of sets of data to be four or more, and the predetermined number is set at, for instance, ten. If the predetermined number of sets of data has not been read, Step 104 is executed to request the operator to input further data. When the predetermined number of data sets have been input and read, Step 106 is executed in which the relationship between the exposure time and the magnification is calculated as a cubic function by using, for instance, the method of least squares. The thus calculated cubic function is, for instance, the one shown in FIG. 3. which is a simple increasing function and in which the exposure time T is expressed as a function of the magnification m. At Step 108, the thus calculated cubic function is stored into the RAM of the microcomputer 52. Subsequently, at Step 110, a set print magnification input through the operation panel 24 is read, and, at Step 112, an exposure time corresponding to the set print magnification is calculated on the basis of the cubic function and is stored into the RAM. At Step 114, the pulse motors 38 and 40 are controlled in accordance with the set print magnification, so that the paper deck 34 with the print paper 36 and the enlarging lens 50 are vertically moved in such a manner as to satisfy the relationship of $1/a + 1/b = 1/f$ (where a represents the distance between the negative film 22 and the enlarging lens 50 and the print paper 36). Since the print magnification m is the ratio: a length y' of a print/ a length y of the negative image, the print magnification $m = b/a$. Therefore, the above-described movement of the print paper 36 and the enlargement lens 50 allows an image to be formed on the print paper 36 at the set print magnification.

At the next step 116, it is determined whether a printing start button provided on the operation panel 24 has been depressed or not. If this button has been depressed, Step 118 is executed to effect exposure control by keeping the shutter 37 open for a period corresponding to the exposure time calculated at Step 112.

The above-described calculation of an exposure time may be arranged in the following manner. The relationship between the exposure time and the print magnification is calculated as a cubic function in a manner similar to that described above with respect to each of the primaries, i.e. red (R), green (G), and blue (B). An exposure time corresponding to the set print magnification is determined on the basis of each of the thus calculated cubic functions with respect to each primary. Filters of a color complementary to each of the primaries that now correspond to the determined exposure times are subsequently inserted into the optical path, and the printing is effected. In this way, it is made possible to correct the balance between colors.

Although in the foregoing description, the exposure time T is expressed as a function of the magnification m, an inverse function may alternatively be used.

We claim:

1. A method of determining an exposure time for a photographic printer which is applicable to a photographic printer capable of varying the print magnification, to determine an exposure time corresponding to a print magnification set during actual printing of said printer, comprising the steps of:
   conducting a plurality of test printings with different test print magnifications, in such a manner as to obtain an optimum test print each time;
   calculating a relationship between the test print magnifications and test exposure times corresponding to said test print magnifications by using a cubic function; and
   determining, on the basis of said relationship, said exposure time corresponding to said set print magnification.

2. A method of determining an exposure time for a photographic printer according to claim 1, wherein said relationships with respect to each of the primaries are calculated by using said cubic function, and the exposure time corresponding to said set print magnification is determined on the basis of each of said relationships with respect to each of the primaries so as to correct the color balance.

3. A method of determining an exposure time for a photographic printer according to claim 1, wherein said test printings are conducted at least four times, and said relationship is calculated on the basis of at least four set said test print magnifications and the exposure times corresponding to said test print magnifications by said cubic function.

4. A method of determining an exposure time for a photographic printer according to claim 1, wherein whether test prints obtained by said test printings are optimum or not are determined by determining whether said test print have the same density.

5. A method of determining an exposure time for a photographic printer according to claim 1, wherein said relationship is a function in which the test exposure time is expressed as a cubic function of the test print magnification.

6. A method of determining an exposure time for a photographic printer according to claim 1, wherein said cubic function is an increasing function.

7. A method of determining an exposure time for a photographic printer which is applicable to a photographic printer capable of varying the print magnification, to determine an exposure time corresponding to a print magnification set during actual printing of said printer, comprising the steps of:
   conducting at least four test printings with different test print magnifications, in such a manner as to obtain a test print having the same density each time;
   measuring test exposure times corresponding to said different print magnifications;
   calculating, on the basis of at least four sets of said test print magnifications and the corresponding test exposure times, an exposure time expressed as a cubic function of a print magnification; and
   determining on the basis of said cubic function, an exposure time corresponding to a set print magnification.

8. A method of determining an exposure time for a photographic printer according to claim 7, wherein said cubic function is calculated as an increasing function.

9. A method of determining an exposure time for a photographic printer which is applicable to a photographic printer capable of varying the print magnification, to determine an exposure time corresponding to a print magnification set during actual printing of said printer, comprising the steps of:
   conducting at least four test printings with different test print magnifications, in such a manner as to obtain a test print having the same density each time;
   measuring test exposure times corresponding to said different print magnifications;
   calculating, on the basis of at least four sets of said test print magnifications and the corresponding test exposure times, a relationship between the test exposure time and the test print magnification by using a cubic function; and
   determining, on the basis of said cubic function, the exposure time corresponding to the set print magnification.

* * * * *